United States Patent
Yamaguchi

(10) Patent No.: US 10,984,297 B2
(45) Date of Patent: Apr. 20, 2021

(54) IMAGE PROCESSING APPARATUS AND METHOD FOR ESTIMATING PAPER THICKNESS

(71) Applicant: Konica Minolta, Inc., Tokyo (JP)

(72) Inventor: Takeshi Yamaguchi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 70 days.

(21) Appl. No.: 16/055,550

(22) Filed: Aug. 6, 2018

(65) Prior Publication Data

US 2019/0080212 A1 Mar. 14, 2019

(30) Foreign Application Priority Data

Sep. 13, 2017 (JP) .............................. JP2017-175354

(51) Int. Cl.
*G06K 15/02* (2006.01)
*G01J 3/46* (2006.01)
*H04N 1/60* (2006.01)

(52) U.S. Cl.
CPC ............ *G06K 15/1809* (2013.01); *G01J 3/46* (2013.01); *G06K 15/1868* (2013.01); *G06K 15/1886* (2013.01); *H04N 1/6097* (2013.01); *G01J 2003/466* (2013.01)

(58) Field of Classification Search
None
See application file for complete search history.

(56) References Cited

U.S. PATENT DOCUMENTS

| 2008/0007801 A1* | 1/2008 | Yotsuyanagi | H04N 1/4095 358/500 |
| 2015/0104201 A1* | 4/2015 | Takahashi | G03G 15/5025 399/15 |
| 2015/0281492 A1* | 10/2015 | Mamura | H04N 1/00726 358/1.15 |
| 2018/0086097 A1* | 3/2018 | Fukuda | G01J 1/0242 |

FOREIGN PATENT DOCUMENTS

JP 2012-191580 A 10/2012

OTHER PUBLICATIONS

English Translation of Ikeda, JP 2012-191580 (Year: 2016).*

* cited by examiner

*Primary Examiner* — Mohammad H Ghayour
*Assistant Examiner* — Pawan Dhingra
(74) *Attorney, Agent, or Firm* — Squire Patton Boggs (US) LLP

(57) ABSTRACT

An image processing apparatus includes: a reader that reads a paper sheet with a background plate serving as a background; and a hardware processor, wherein the hardware processor: obtains, from the reader, a first color value in which an image on one side of the paper sheet is read, a second color value in which a ground color of the other side of the paper sheet is read, and a third color value in which a portion corresponding to the image on the other side of the paper sheet is read; and estimates a thickness of the paper sheet on the basis of the first to third color values while referring to a predetermined table.

28 Claims, 8 Drawing Sheets

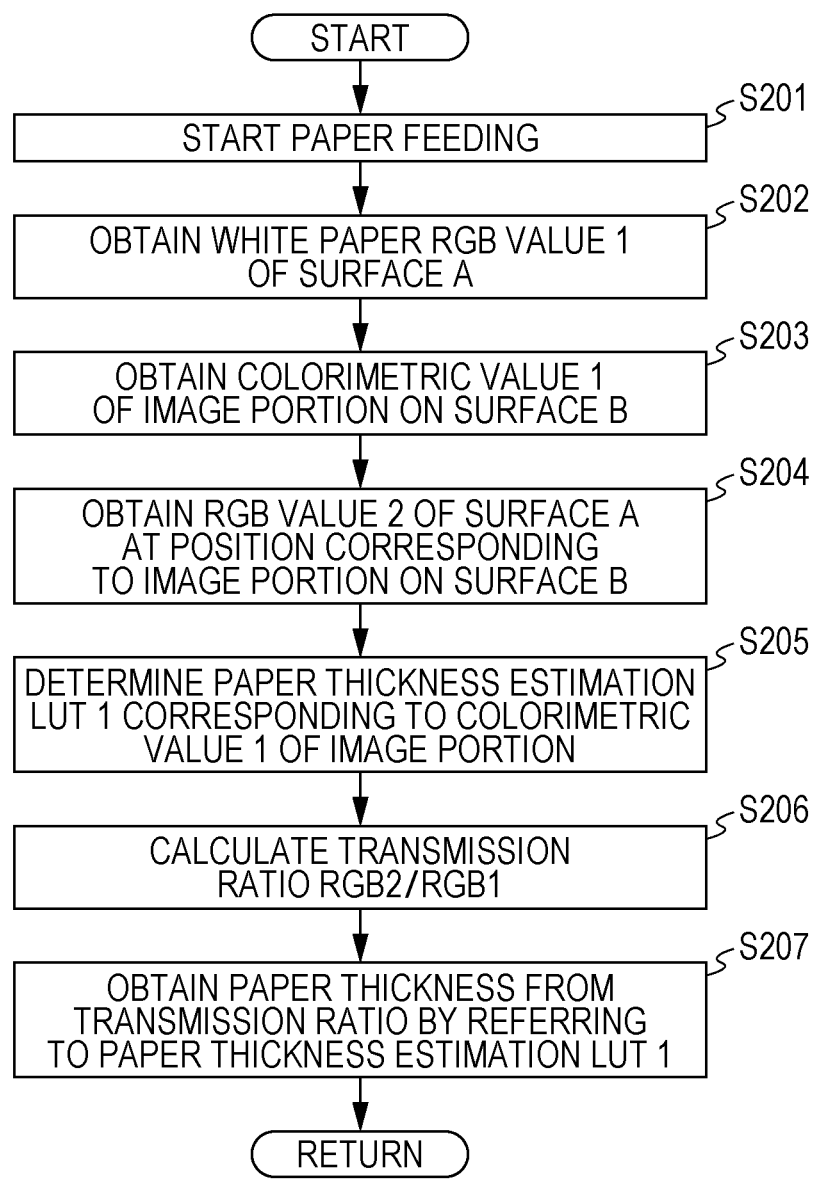

IMAGE PROCESSING APPARATUS AND METHOD FOR ESTIMATING PAPER THICKNESS

The entire disclosure of Japanese patent Application No. 2017-175354, filed on Sep. 13, 2017, is incorporated herein by reference in its entirety.

BACKGROUND

Technological Field

The present invention relates to an image processing apparatus, a paper thickness estimation program, and a method for estimating a paper thickness. In particular, the present invention relates to an image processing apparatus that includes a reader such as a scanner and a colorimeter, a paper thickness estimation program that operates in a system including the image processing apparatus, and a method for estimating a paper thickness for the system.

Description of the Related Art

In an image processing apparatus such as a printer, a color correction is performed using a color correction table (profile). Since the color correction table changes depending on a thickness of a paper sheet, it becomes necessary to switch the color correction table in a case where the paper thickness changes during the color correction. In the color correction, while the paper sheet is read using a reader such as a scanner or a colorimeter disposed to face a background plate with the paper sheet interposed therebetween, influence exerted by the paper thickness increases when the background plate is black.

Various methods for estimating the paper thickness on the basis of information measured using the reader have been proposed. For example, JP 2012-191580 A discloses an image reading apparatus for reading an image of a document, the image reading apparatus including: first and second readers that read an image on the same side of the same document with backgrounds of an achromatic dark background member and a white background member, respectively; an estimation part that estimates a thickness of the read document by a background level of a first image data obtained by the reading performed by the first reader and a background level of a second image data obtained by the reading performed by the second reader; and a first correction part that corrects the second image data using a correction coefficient corresponding to the thickness estimated by the estimation part.

Although the paper thickness can be estimated by using the method disclosed in JP 2012-191580 A, the image on the same side of the same document needs to be measured twice according to this method, that is, with each of the backgrounds of the achromatic dark background member and the white background member, whereby there may have been a problem that the measurement takes time and effort.

SUMMARY

The present invention has been conceived in view of the above-mentioned problem, and a main object of the present invention is to provide an image processing apparatus, a paper thickness estimation program, and a method for estimating a paper thickness capable of estimating a paper thickness while simultaneously performing a different color management function such as color verification and calibration without switching a background color.

To achieve the abovementioned object, according to an aspect of the present invention, an image processing apparatus reflecting one aspect of the present invention comprises: a reader that reads a paper sheet with a background plate serving as a background; and a hardware processor, wherein the hardware processor: obtains, from the reader, a first color value in which an image on one side of the paper sheet is read, a second color value in which a ground color of the other side of the paper sheet is read, and a third color value in which a portion corresponding to the image on the other side of the paper sheet is read; and estimates a thickness of the paper sheet on the basis of the first to third color values while referring to a predetermined table.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a flowchart illustrating an operation (paper thickness estimation processing) of a printer according to an example of the present invention.

DETAILED DESCRIPTION OF EMBODIMENTS

Hereinafter, one or more embodiments of the present invention will be described with reference to the drawings. However, the scope of the invention is not limited to the disclosed embodiments.

As mentioned in the description of the related art, since a color correction table changes depending on a thickness of a paper sheet, when a paper thickness changes during a color correction, it becomes necessary to switch the color correction table. In particular, influence exerted by the paper thickness increases when a background plate is black. In order to address this problem, JP 2012-191580 A discloses a method for estimating a paper thickness by reading an image on the same side of the same document with backgrounds of an achromatic dark background member and a white background member, respectively. However, the measurement needs to be performed twice according to this method, that is, with the dark background and the white background, whereby there may have been a problem that the measurement takes time and effort.

In view of the above, in one embodiment of the present invention, a paper thickness is estimated by measuring an offset amount of toner. Specifically, using a reader such as a scanner and a colorimeter, a first color value in which an image on one side of a paper sheet is read (e.g., colorimetric value such as L*a*b* value and XYZ value obtained by reading the image using the colorimeter disposed on one side of the paper sheet), a second color value in which a ground color of the other side of the paper sheet is read (e.g., RGB value 1 obtained by reading the ground color of the paper sheet using the scanner disposed on the other side of the paper sheet), and a third color value in which a portion corresponding to the image on the other side of the paper sheet is read (e.g., RGB value 2 obtained by reading an offset of the image using the scanner) are obtained, and the paper thickness is estimated on the basis of the first to third color values (colorimetric value, RGB value 1, and RGB value 2) while referring to a paper thickness estimation table for associating the paper thickness with a ratio of the RGB value (RGB value 2/RGB value 1) prepared in advance by changing density of the image.

Figure 1A:
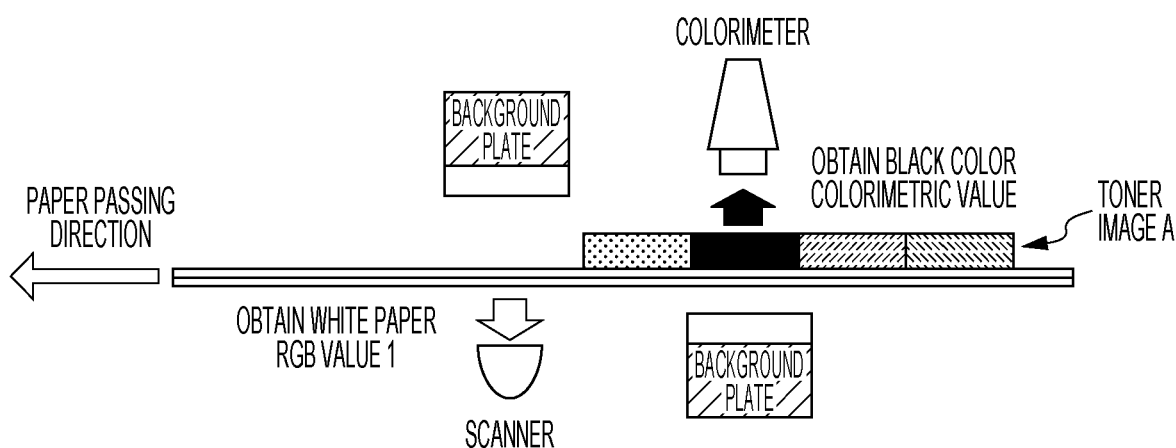
FIGS. 1A and 1B are schematic diagrams illustrating a method for estimating a paper thickness (in a case of a thin paper sheet) according to an embodiment of the present invention.
Figure 1B:
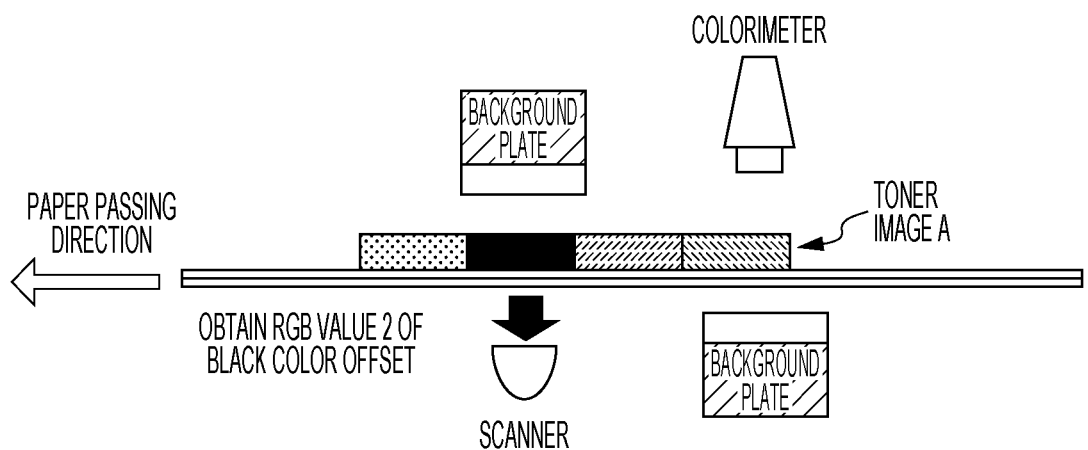
Figure 2A:
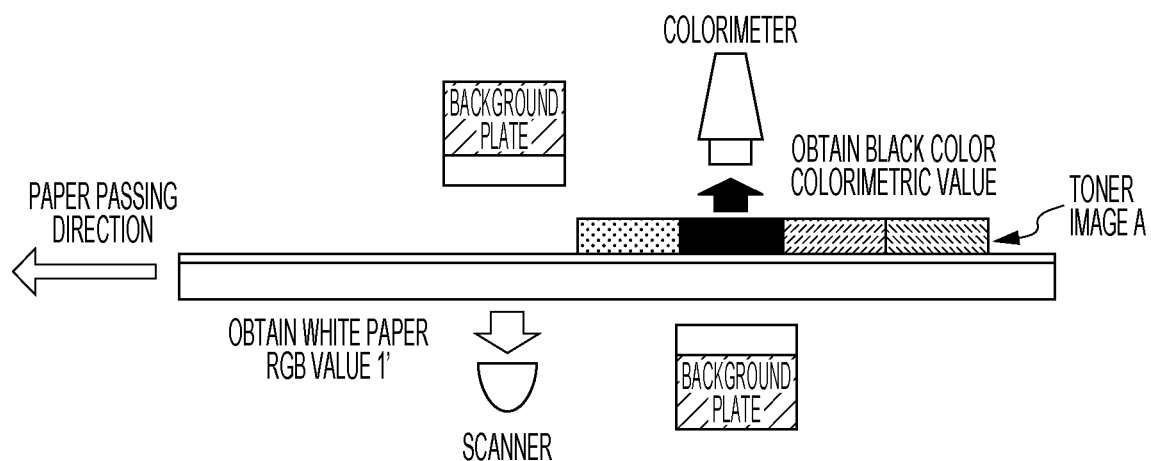
FIGS. 2A and 2B are schematic diagrams illustrating a method for estimating a paper thickness (in a case of a thick paper sheet) according to an embodiment of the present invention.
Figure 2B:
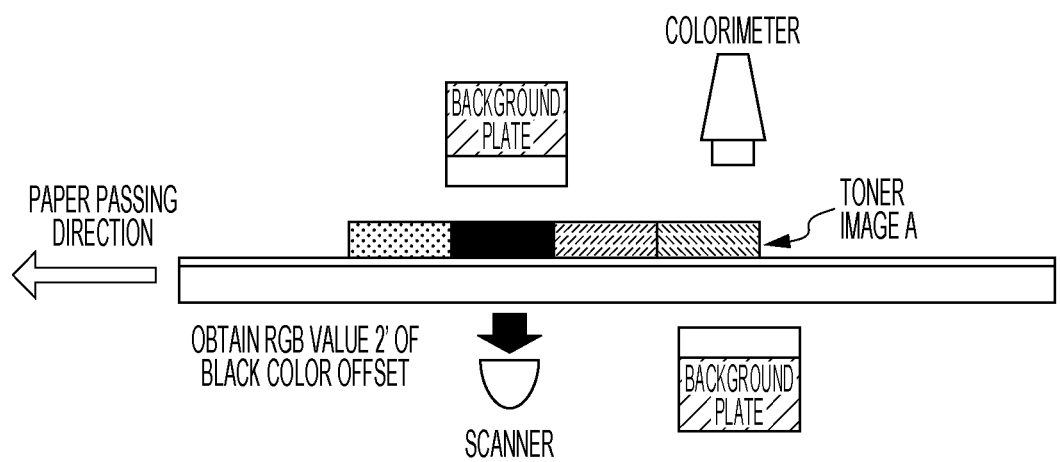

The above-mentioned method for estimating a paper thickness according to the present embodiment will be described with reference to the accompanying drawings. FIGS. 1A and 1B, and FIGS. 2A and 2B are schematic diagrams illustrating a method for estimating a paper thickness with respect to an image processing apparatus including a colorimeter provided on one side of the front and back sides of a paper sheet along a paper conveying path, a scanner provided on the other side of the paper sheet, and background plates facing the colorimeter and the scanner, respectively, with the paper sheet interposed therebetween, which is in the same color (preferably white). FIGS. 1A and 1B illustrate a case of a thin paper sheet, and FIGS. 2A and 2B illustrate a case of a thick paper sheet.

For example, as illustrated in FIGS. 1A and 2A, a colorimetric value in which a toner image A (preferably a solid K toner image) attached to the font surface (or back surface) of the paper sheet is measured by the colorimeter is obtained, and a white paper RGB value 1 in which a portion other than the toner image A (paper sheet base) on the back surface (or front surface) is measured by the scanner is obtained. Then, as illustrated in FIGS. 1B and 2B, the paper sheet is conveyed in a paper passing direction, and an offset RGB value 2 in which the toner image A is measured by the scanner from the back surface (or front surface) side is obtained.

Figure 3:
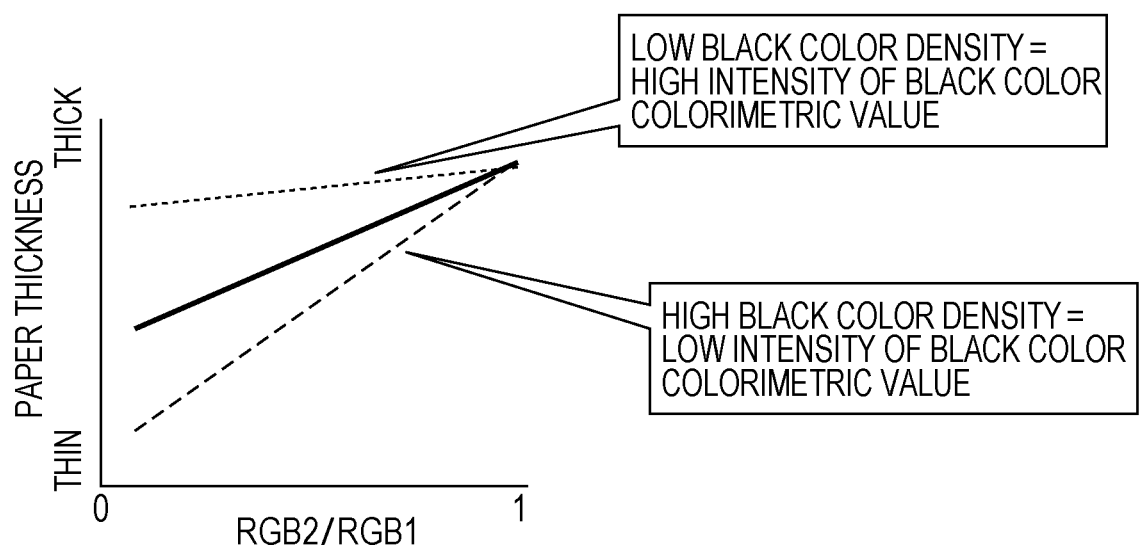
FIG. 3 is an exemplary paper thickness estimation table according to an embodiment of the present invention.

Meanwhile, as illustrated in FIG. 3, a plurality of paper thickness estimation tables indicating a correspondence between the paper thickness and RGB value 1/RGB value 2 is prepared in advance corresponding to the density of the toner image (preferably black toner image), and the paper thickness estimation table corresponding to the colorimetric value of the toner image A is determined from among the plurality of paper thickness estimation tables. Subsequently, the ratio between RGB value 1 and RGB value 2 (RGB value 1/RGB value 2) is calculated, and the paper thickness corresponding to the calculated ratio of RGB value 1/RGB value 2 is obtained using the paper thickness estimation table determined above.

In this manner, the paper thickness estimation table is determined on the basis of the colorimetric value in which the toner image is measured by the colorimeter, the ratio of the RGB values in which the ground color of the paper sheet and the offset of the toner image is measured by the scanner is calculated, and the paper thickness corresponding to the calculated ratio is obtained using the determined paper thickness estimation table, whereby a proper color correction can be executed and an erroneous insertion of a paper sheet can be suppressed. Further, it is not necessary to perform the measurement twice by switching the background plate according to this method for estimating a paper thickness, whereby the paper thickness can be obtained easily and the paper thickness can be estimated while simultaneously performing a different color management function such as color verification and calibration. Furthermore, according to the image processing apparatus including an in-line colorimeter and the scanner, the paper thickness can be estimated without being provided with an additional sensor.

Figure 4:
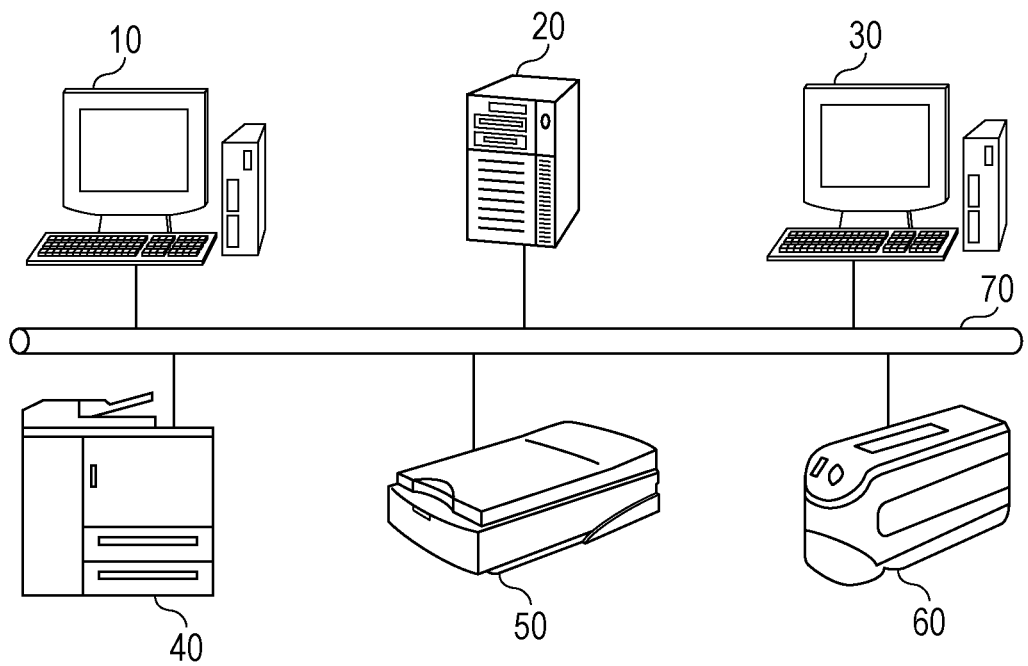
FIG. 4 is a schematic diagram illustrating an exemplary configuration of a printing system according to an example of the present invention.
Figure 5A:
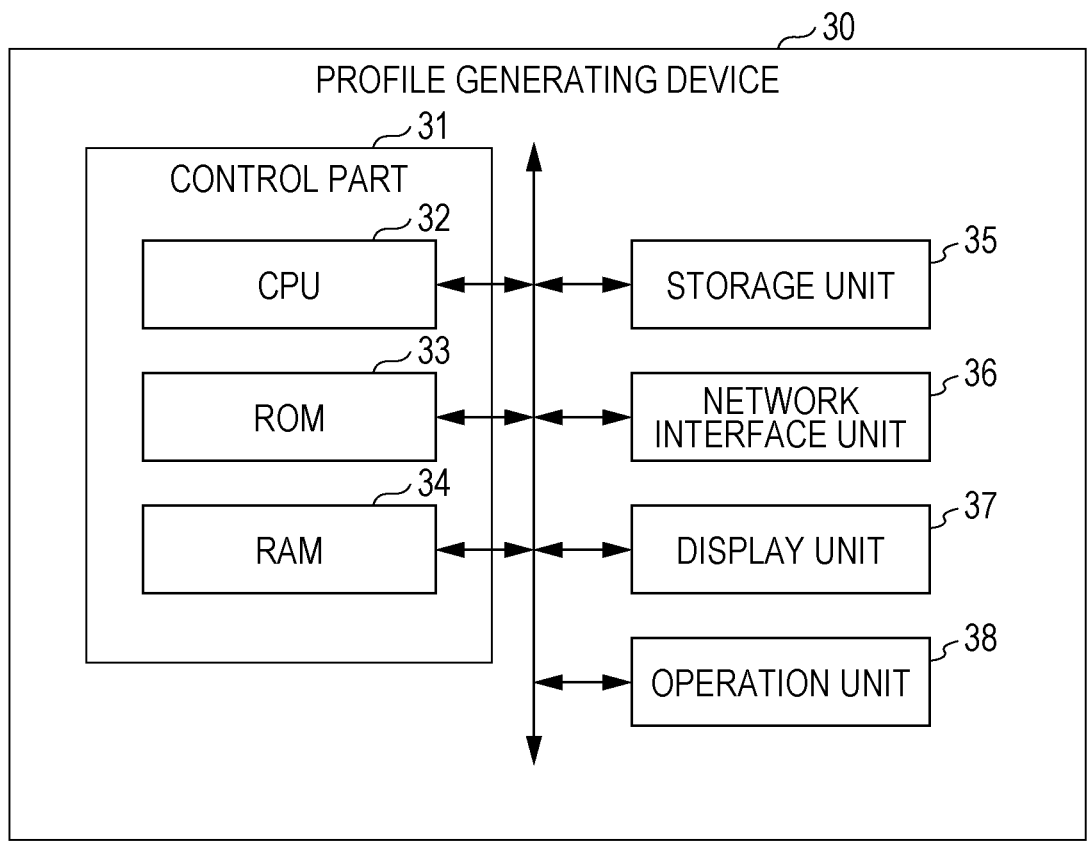
FIGS. 5A and 5B are block diagrams illustrating a configuration of a profile generating device according to an example of the present invention.
Figure 5B:
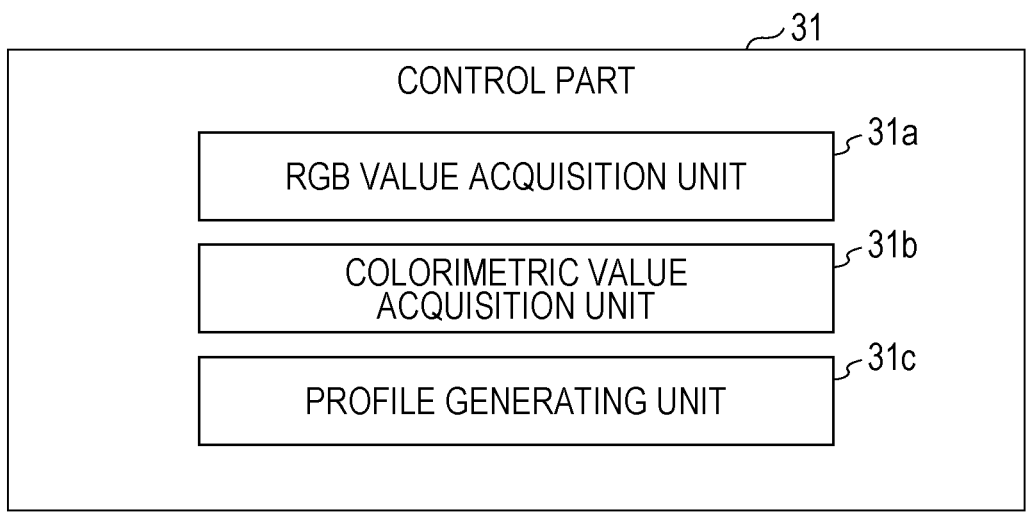
Figure 6:
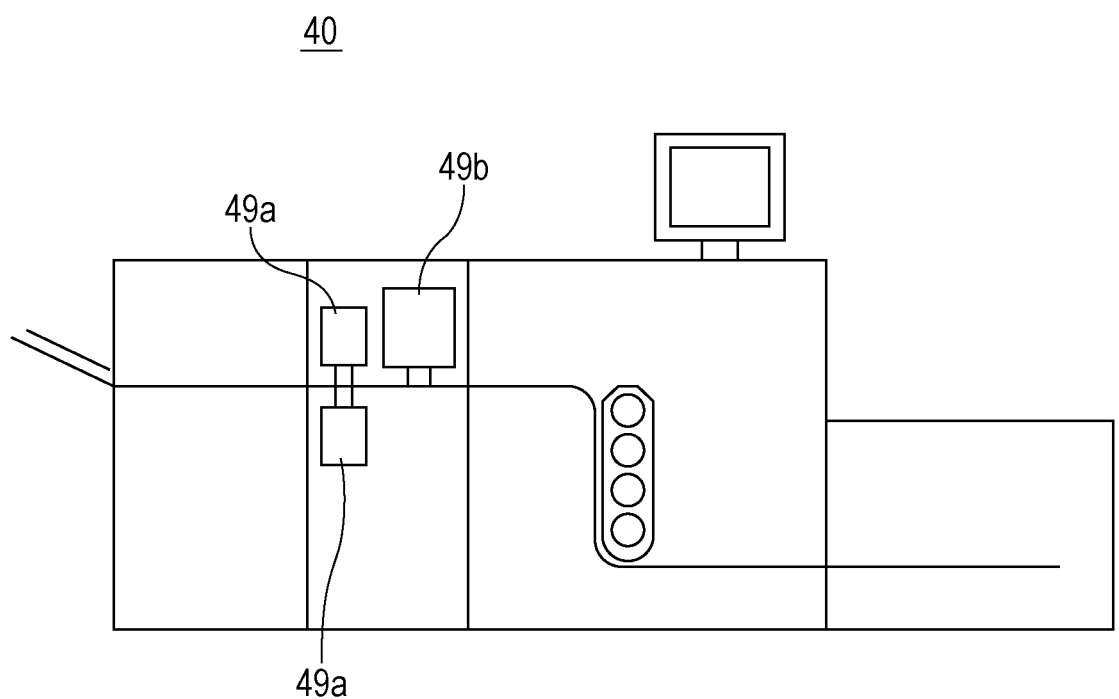
FIG. 6 is a schematic diagram illustrating an exemplary configuration of a printer (in a case where a scanner and a colorimeter are included) according to an example of the present invention.
Figure 7A:
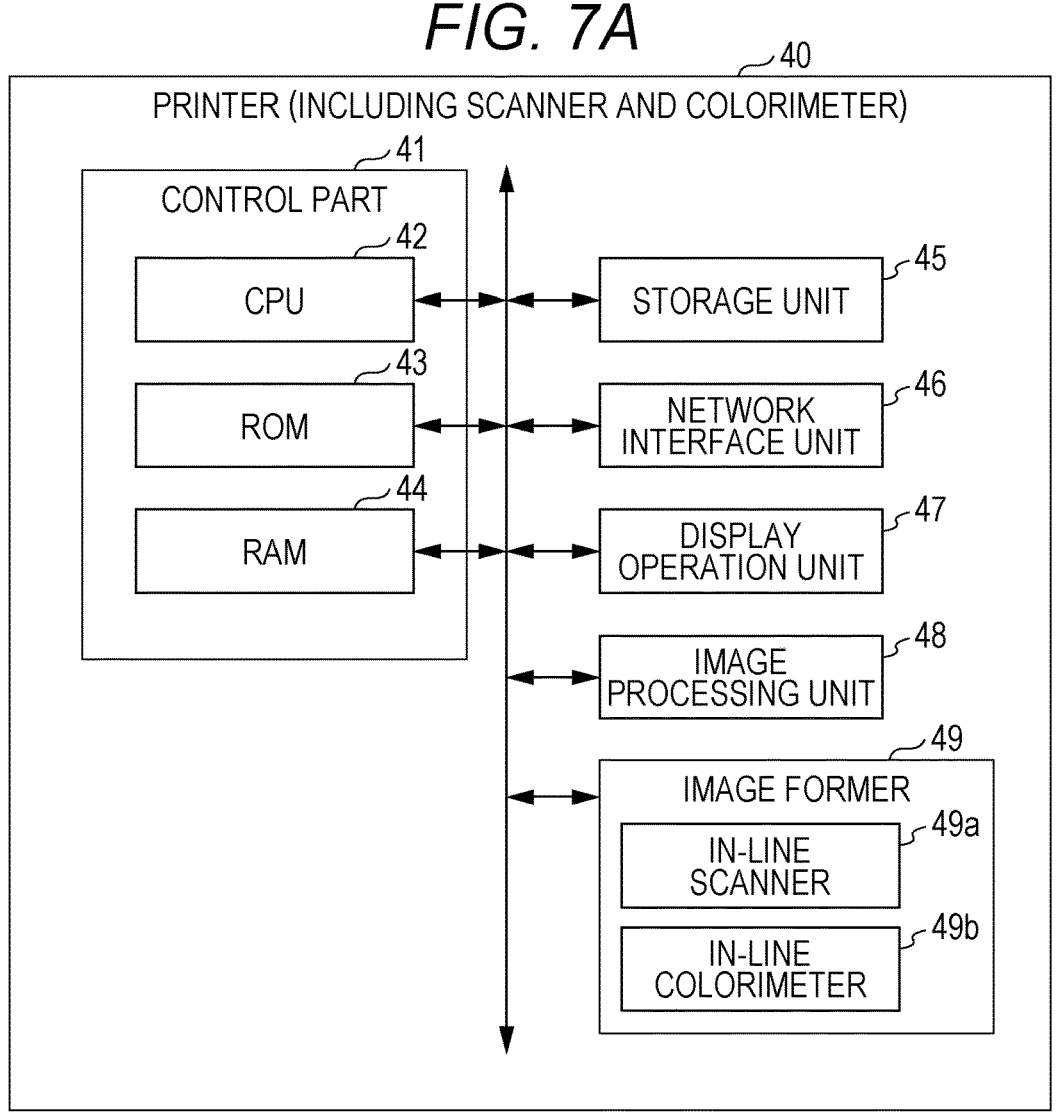
FIGS. 7A and 7B are block diagrams illustrating a configuration of a printer (in a case where a scanner and a colorimeter are included) according to an example of the present invention.
Figure 7B:
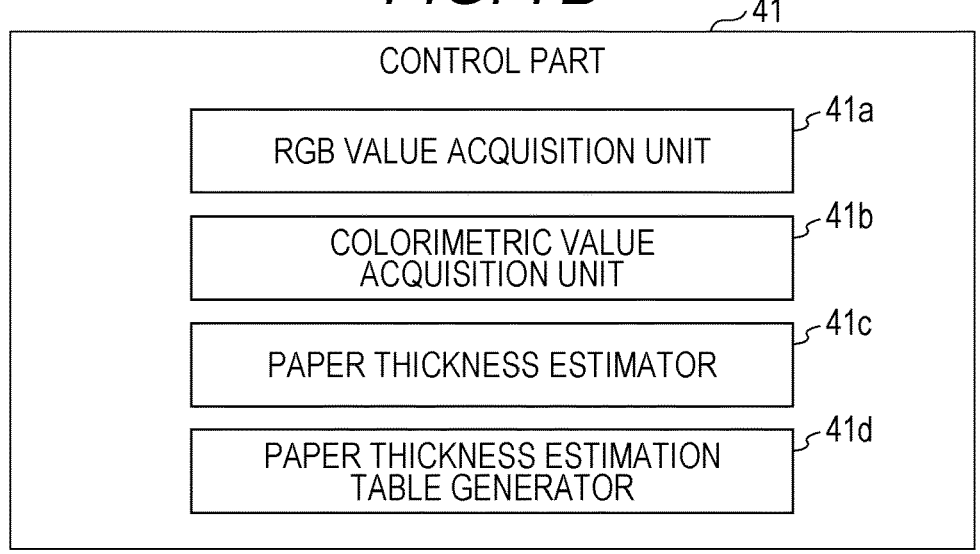
Figure 8:
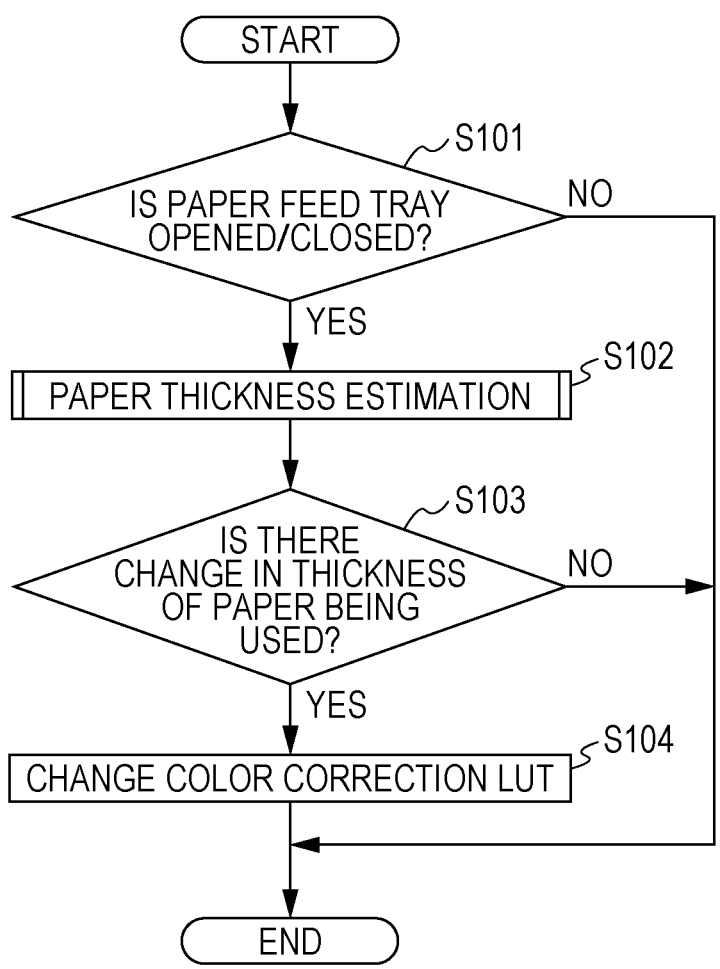
FIG. 8 is a flowchart illustrating an operation (color correction LUT switching processing) of a printer according to an example of the present invention.

In order to describe the above-mentioned embodiment of the present invention in more detail, an image processing apparatus, a paper thickness estimation program, and a method for estimating a paper thickness according to an example of the present invention will be described with reference to FIGS. 4 to 9. FIG. 4 is a schematic diagram illustrating an exemplary configuration of a printing system according to the present example. FIGS. 5A and 5B are block diagrams illustrating a configuration of a profile generating device according to the present example. FIG. 6 is a schematic diagram illustrating an exemplary configuration of a printer (in a case where a scanner and a colorimeter are included) according to the present example. FIGS. 7A and 7B are block diagrams illustrating a configuration of the printer (in a case where a scanner and a colorimeter are included). FIGS. 8 and 9 are flowcharts illustrating an operation of the printer according to the present example.

As illustrated in FIG. 4, the printing system according to the present example includes an output instruction terminal 10, a controller 20, a profile generating device 30, a printer 40, a scanner 50, a colorimeter 60, and the like. These are connected via a communication network 70 such as a local area network (LAN) and a wide area network (WAN) defined by standards such as Ethernet (registered trademark), Token Ring, and fiber-distributed data interface (FDDI). The controller 20 and the printer 40 may be coupled to each other via a dedicated line such as a peripheral component interconnect (PCI) connection.

The output instruction terminal 10 is a computer device of a client, and issues a job that provides a print instruction with the controller 20 using a printer driver or dedicated software.

The controller 20 performs image processing such as a color conversion, a color correction, screening, and rasterization on the job issued by the output instruction terminal 10, and transfers the image data having been subject to the image processing to the printer 40. The color conversion and the color correction described above are performed using a scanner profile, a printer profile, and a color correction LUT generated by the profile generating device 30.

The profile generating device 30 generates the scanner profile and the printer profile using a color chart output from the printer 40. A detailed configuration of the profile generating device 30 will be described later.

The printer 40 receives the image data from the controller 20, forms an image based on the image data on a paper sheet, and outputs the image. A detailed configuration of the printer 40 will also be described later.

The scanner 50 includes, for example, three kinds of RGB sensors, scans the color chart output from the printer 40, and outputs the RGB value.

The colorimeter 60 is a spectrum colorimeter (spectrocolorimeter) capable of performing measurement for each wavelength of light, performs colorimetry on the color chart output from the printer 40, and outputs the colorimetric value (such as L*a*b* value and XYZ value).

Note that FIG. 4 is an example of the printing system according to the present example, and the configuration thereof may be changed as appropriate. For example, the controller 20 may be incorporated in the printer 40, the profile generating device 30 may be incorporated in the controller 20 or the printer 40, and the scanner 50 and the colorimeter 60 may be incorporated in the printer 40. Hereinafter, the profile generating device 30 and the printer 40 will be described in detail.

[Profile Generating Device]

As illustrated in FIG. 5A, the profile generating device 30 includes a control part 31, a storage unit 35, a network interface unit 36, a display unit 37, an operation unit 38, and the like.

The control part 31 includes a central processing unit (CPU) 32, a read only memory (ROM) 33, a random access memory (RAM) 34, and a memory. The CPU 32 executes a control program stored in the ROM 33 and the storage unit 35 by expanding the control program in the RAM 34, thereby controlling an operation of the entire profile generating device 30.

The storage unit 35 includes a hard disk drive (HDD), a solid state drive (SSD), and the like, and stores a program for the CPU 32 to control each part, information associated with processing function of the device itself, a profile generated by a profile generating unit 31c to be described later, the color correction LUT, and the like.

The network interface unit 36 includes a network interface card (NIC), a modem, and the like, and connects the profile generating device 30 to the communication network 70 to enable data communication with the controller 20, the printer 40, the scanner 50, and the colorimeter 60.

The display unit 37 is a liquid crystal display (LCD), an organic electro luminescence (EL) display, and the like, and displays various screens relating to generation and modification of the scanner profile.

The operation unit 38 is a mouse, a keyboard, a hard switch, and the like, and enables various operations relating to generation and modification of the scanner profile.

As illustrated in FIG. 5B, the control part 31 functions as an RGB value acquisition unit 31a, a colorimetric value acquisition unit 31b, the profile generating unit 31c, and the like.

The RGB value acquisition unit 31a obtains an RGB value of each patch of the color chart from the scanner (or in-line scanner 49a of the printer 40 to be described later) 50.

The colorimetric value acquisition unit 31b obtains a colorimetric value of each patch of the color chart from the colorimeter (or in-line colorimeter 49b of the printer 40 to be described later) 60.

The profile generating unit 31c generates a profile for associating the RGB value obtained by the RGB value acquisition unit 31a with the colorimetric value obtained by the colorimetric value acquisition unit 31b (converting the RGB value into the colorimetric value). Further, the color correction LUT for correcting the profile is generated. At this time, paper sheet information (particularly the thickness of the paper sheet) of the color chart is obtained so that the generated profile and the color correction LUT in association with the thickness of the paper are saved in the storage unit 35 or the like or transmitted to the printer 40.

[Printer]

The printer 40 is an image processing apparatus such as a multifunction peripheral (MFP), which is capable of outputting a color chart for generating the scanner profile, or a color chart for, for example, calibrating the printer, generating the printer profile, or verifying a color, and have a color management function such as color correction, color verification, and calibration. Although the printer 40, the scanner 50, and the colorimeter 60 are provided as separate devices in FIG. 4, the scanner 50 and the colorimeter 60 may be incorporated in the printer 40 as illustrated in FIG. 6. As illustrated in FIG. 7A, the printer 40 includes a control part 41, a storage unit 45, a network interface unit 46, a display operation unit 47, an image processing unit 48, an image former 49, and the like.

The control part 41 includes a CPU 42, and a memory such as a ROM 43 and a RAM 44. The CPU 42 executes a control program stored in the ROM 43 and the storage unit 45 by expanding the control program in the RAM 44, thereby controlling an operation of the entire printer 40.

The storage unit 45 includes an HDD, an SSD, and the like, and stores a program for the CPU 42 to control each part, information associated with processing function of the device itself, the scanner profile, the printer profile, the color correction LUT, a paper thickness estimation table generated by a paper thickness estimation table generator 41d to be described later, and the like.

The network interface unit 46 includes an NIC, a modem, and the like, and connects the printer 40 to the communication network 70 to enable data communication with the controller 20, the profile generating device 30, and the like.

The display operation unit 47 is, for example, a touch panel provided with a pressure-sensitive operation unit (touch sensor) in which transparent electrodes are disposed in a lattice pattern on a display unit, and displays various screens relating to a printing process, thereby enabling various operations relating to the printing. In the present example, in particular, a screen that notifies a user of a paper thickness estimated by a paper thickness estimator 41c to be described later and a warning screen that warns the user of, when the paper thickness set by the user does not coincide with the paper thickness estimated by the paper thickness estimator 41c, such a situation are displayed. Further, when the paper thickness estimator 41c changes the color correction LUT, the user displays a screen for instructing next processing. Furthermore, when the printer 40 has a function of the profile generating device 30, the display operation unit 47 displays various screens relating to generation and modification of the scanner profile, thereby enabling various operations relating to the generation and the modification of the scanner profile.

The image processing unit 48 is provided when the printer 40 has a function of the controller 20, performs image processing such as a color conversion, a color correction, screening, and rasterization on the job issued by the output instruction terminal 10, and transfers the image data having been subject to the image processing to the image former 49.

The image former (printing engine) 49 executes a printing process on the paper sheet supplied from a paper feed tray on the basis of the image data having been subject to the image processing. The image former 49 forms an electrostatic latent image by irradiating a photosensitive drum charged by a charging device with light corresponding to the image from an exposure device, develops the electrostatic latent image by attaching charged toner using a developing device, primarily transfers the toner image onto a transfer belt, secondarily transfers the toner image onto a paper sheet from the transfer belt, and fixes the toner image on the paper sheet using a fixing device. Each paper feed tray includes a sensor that detects opening/closing of the paper feed tray. Moreover, when the printer 40 has functions of the scanner 50 and the colorimeter 60, the image former 49 includes, as a reader, the in-line scanner 49a and the in-line colorimeter 49b.

The in-line scanner 49a includes, for example, three kinds of RGB sensors, and outputs the RGB value obtained by the RGB sensor. In the present example, the in-line scanner 49a is disposed on the front surface side and the back surface side of the paper sheet, and includes a background plate (preferably white background plate) serving as a background when the in-line scanner 49a performs reading by interposing a paper conveying path.

The in-line colorimeter 49b is, for example, a spectrum colorimeter (spectrocolorimeter) capable of performing measurement for each wavelength of light, similar to the external colorimeter, and outputs the colorimetric value (such as L*a*b* value and XYZ value) at precision similar to that of the external colorimeter. In the present example, the in-line colorimeter 49b is disposed on the front surface side of the paper sheet, and includes a background plate (preferably background plate in the same color as that of the in-line scanner 49a) serving as a background when the in-line colorimeter 49b performs reading by interposing the paper conveying path.

The in-line scanner 49a and the in-line colorimeter 49b may be devices at least capable of obtaining a measured value of reflected light. As described above, by disposing the in-line scanner 49a and the in-line colorimeter 49b on both sides of the paper sheet, the paper thickness can be estimated by one paper feeding. Meanwhile, the in-line scanner 49a and the in-line colorimeter 49b may be disposed on one side of the paper sheet while a reversing mechanism that reverses the front and back of the paper sheet is provided in the paper conveying path, and paper feeding may be performed twice (after one paper feeding, another paper feeding is performed by reversing the front and back) to perform the measurement. Although the case where the in-line scanner 49a and the in-line colorimeter 49b are provided as readers has been described in the present example, a configuration in which the in-line scanners 49a are provided on both sides of the paper sheet may be employed.

As illustrated in FIG. 7B, the control part 41 functions as an RGB value acquisition unit 41a, a colorimetric value acquisition unit 41b, the paper thickness estimator 41c, the paper thickness estimation table generator 41d, and the like. The RGB value acquisition unit 41a and the colorimetric value acquisition unit 41b are collectively referred to as a color value acquirer.

The RGB value acquisition unit 41a obtains, from the in-line scanner 49a, an RGB value obtained by reading a ground color of a portion outside the image (non-image portion) on the back surface of the paper sheet (referred to as white paper RGB value), and also obtains an RGB value obtained by reading the portion corresponding to the image on the back surface of the paper sheet (referred to as offset RGB value).

The in-line colorimetric value acquisition unit 41b obtains, from the in-line colorimeter 49b, the colorimetric value obtained by reading the image on the front surface of the paper sheet. It is preferable to use a solid K image or an image of a plurality of patches as the image to be formed on the front surface of the paper sheet.

The paper thickness estimator 41c determines the paper thickness estimation table corresponding to the colorimetric value obtained by the colorimetric value acquisition unit 41b from among a plurality of paper thickness estimation tables corresponding to density of the image generated by the paper thickness estimation table generator 41d to be described later. Subsequently, the ratio between the white paper RGB value and the offset RGB value, which are obtained by the RGB value acquisition unit 41a, is calculated, and the paper thickness corresponding to the calculated ratio is obtained using the determined paper thickness estimation table. When there is no paper thickness estimation table corresponding to the colorimetric value obtained by the colorimetric value acquisition unit 41b in the plurality of paper thickness estimation tables corresponding to the density of the image, a first paper thickness estimation table corresponding to a density higher than the colorimetric value and a second paper thickness estimation table corresponding to a density lower than the colorimetric value are specified, and an interpolation calculation is performed using the first paper thickness estimation table and the second paper thickness estimation table, thereby generating the paper thickness estimation table corresponding to the colorimetric value obtained by the colorimetric value acquisition unit 41b. A timing of estimating the paper thickness can be set as appropriate. For example, the paper thickness estimator 41c may monitor an output signal from a sensor for detecting opening/closing of the paper feed tray provided on each paper feed tray to estimate the paper thickness when the opening/closing of the paper feed tray is detected, or the paper thickness estimator 41c may monitor a signal from the display operation unit 47 to estimate the paper thickness when an operation instructing a front/back adjustment is detected. As necessary, the paper thickness estimator 41c notifies the user of the estimated paper thickness, and warns the user when the paper thickness set by the user does not coincide with the estimated paper thickness. Further, as necessary, the paper thickness estimator 41c performs control such that the color correction LUT to be used for the color correction is switched on the basis of the estimated paper thickness when the paper thickness set by the user does not coincide with the estimated paper thickness, and receives an instruction on the next processing made by the user.

The paper thickness estimation table generator 41d obtains the white paper RGB value and the offset RGB value from each of a plurality of paper sheets having different thickness in which images having different densities are formed on the front surface, generates a paper thickness estimation table in which the paper thickness is associated with the ratio between the white paper RGB value and the offset RGB value for each density of the image, and saves the paper thickness estimation table in the storage unit 45 or the like.

The RGB value acquisition unit 41a, the colorimetric value acquisition unit 41b, the paper thickness estimator 41c, and the paper thickness estimation table generator 41d may be configured as hardware, or may be configured as a paper thickness estimation program that causes the control part 41 to function as the RGB value acquisition unit 41a, the colorimetric value acquisition unit 41b, the paper thickness estimator 41c, and the paper thickness estimation table generator 41d (particularly the RGB value acquisition unit 41*a*, the colorimetric value acquisition unit 41*b*, and the paper thickness estimator 41*c*) and the CPU 42 is caused to execute the paper thickness estimation program.

Note that FIGS. 4 to 7B are examples of the printing system, the profile generating device 30, and the printer 40 according to the present example, and the configurations may be changed as necessary. For example, although the control part 41 of the printer 40 functions as the RGB value acquisition unit 41*a*, the colorimetric value acquisition unit 41*b*, the paper thickness estimator 41*c*, and the paper thickness estimation table generator 41*d* in the above descriptions, a control unit of the controller 20 for controlling the printer 40 may function as the RGB value acquisition unit 41*a*, the colorimetric value acquisition unit 41*b*, the paper thickness estimator 41*c*, and the paper thickness estimation table generator 41*d* (a CPU of the controller 20 is caused to execute the paper thickness estimation program).

Hereinafter, operation of the printing system of the present example will be described. The CPU 42 executes the paper thickness estimation program stored in the ROM 43 or the storage unit 45 by expanding the paper thickness estimation program in the RAM 44, thereby executing processing of each step illustrated in flowcharts in FIGS. 8 and 9. In the flow to be described below, the printer 40 in FIGS. 7A and 7B is employed. The image former 49 of the printer 40 includes the in-line scanner 49*a* and the in-line colorimeter 49*b*, the in-line colorimeter 49*b* is disposed on the front surface side of the paper sheet, the in-line scanner 49*a* is disposed on the back surface side of the paper sheet, and the background plates are disposed on each of the in-line scanner 49*a* and the in-line colorimeter 49*b* with the paper conveying path interposed therebetween. Further, the paper thickness estimation table generator 41*d* generates a plurality of paper thickness estimation tables (referred to as paper thickness estimation LUT in this case) corresponding to the density of the image in advance, and the generated paper thickness estimation table is stored in the storage unit 45 or the like.

First, the control part 41 (paper thickness estimator 41*c*) monitors the output signal from the sensor for detecting opening/closing of the paper feed tray provided on each paper feed tray, and determines whether the paper feed tray is opened/closed (S101). Although the opening/closing of the paper feed tray is made as a trigger in the present example since it is preferable to check at the timing when misplacement of a different type of paper occurs, the paper thickness estimation may be performed together with other steps for measuring the paper such as a front/back adjustment function. In such a case, the paper thickness estimation can be performed by monitoring the signal from the display operation unit 47 and making a front/back adjustment instruction as a trigger.

Next, when the paper feed tray is determined to be opened/closed (Yes in S101), the control part 41 (paper thickness estimator 41*c*) estimates the paper thickness (S102). FIG. 9 illustrates the detail of this step. When paper feeding is started and the paper sheet is conveyed to the in-line scanner 49*a* and the in-line colorimeter 49*b* (S201), the in-line scanner 49*a* measures the non-image portion on the surface (surface A, in this case) opposite to the surface on which an image (chart, in this case) is drawn, and the control part 41 (RGB value acquisition unit 41*a*) obtains the white paper RGB value 1 from the in-line scanner 49*a* (S202).

Next, the in-line colorimeter 49*b* measures an image portion on the surface on which the image is drawn (referred to as surface B), and the control part 41 (colorimetric value acquisition unit 41*b*) obtains a colorimetric value 1 of the image portion on the surface B from the in-line colorimeter 49*b* (S203). Although the in-line colorimeter 49*b* is preferably a spectrocolorimeter, a simple colorimeter may be used. Although precision is low, a sensor such as a charge coupled device (CCD) may be used. Further, although the image is preferably a solid K image having high sensitivity, a plurality of patches may be measured and weighted to obtain an average. Furthermore, since a measured value of the solid K image is not stable when the sensor such as the CCD is employed, when the sensor such as the CCD is used, a thin patch may be more preferable than a solid patch in some cases.

Next, the in-line scanner 49*a* measures the surface A at the position corresponding to the image portion on the surface B, and the control part 41 (RGB value acquisition unit 41*a*) obtains the offset RGB value 2 of surface A from the in-line scanner 49*a* (S204). Here, when the paper sheet is thin, the image portion on the surface B is transparent, whereby an RGB value darker than the RGB value 1 in which the white paper is measured is obtained.

Next, the control part 41 (paper thickness estimator 41*c*) determines a paper thickness estimation LUT 1 corresponding to the colorimetric value 1 of the image portion obtained in S203 from among a plurality of paper thickness estimation LUTs stored in the storage unit 45 in advance (S205). The colorimetric value of the image portion is correlated to a thickness (density) of a color material (toner), and the darker the color, the easier the RGB value 2 becomes darker. Accordingly, in order to estimate the paper thickness, the paper thickness estimation LUT needs to be switched depending on an amount of the color material. In view of the above, in the present example, a plurality of color thickness estimation LUTs is prepared corresponding to the amount of the color material so that the paper thickness estimation LUT having a similar amount of the color material is selected or the paper thickness estimation LUT is calculated by performing an interpolation calculation. Although an index of the amount of the color material is preferably an L* value of CIELAB when the solid K patch is used, a Y value of XYZ or the like may be used. When a plurality of patches is used, an average L* value or the like may be used. Note that a patch that does not depend on intensity, such as a solid Y, is not preferably used.

Next, the control part 41 (paper thickness estimator 41*c*) calculates a ratio between the white paper RGB value 1 and the offset RGB value 2 of the image portion (transmission ratio: RGB 2/RGB 1) (S206). Assuming that the amount of the color material is constant, the transmission ratio RGB 2/RGB1 is highly correlated to the paper thickness.

Next, the control part 41 (paper thickness estimator 41*c*) estimates the paper thickness by obtaining the paper thickness corresponding to the transmission ratio RGB 2/RGB 1 calculated in S206 using the paper thickness estimation LUT 1 determined in S205 (S207).

Returning to FIG. 8, the control part 41 (paper thickness estimator 41*c*) compares the paper thickness stored before the opening/closing of the paper feed tray (paper thickness set by the user) with the paper thickness estimated in the above step, and determines whether the paper thickness having been used is changed (S103). Here, when the difference between the stored paper thickness and the estimated paper thickness is within a predetermined threshold value, it may be regarded as the same paper thickness.

Then, when determining that the paper thickness having been used is changed (Yes in S103), the control part 41 (paper thickness estimator 41c) notifies the user of the estimated paper thickness, warns the user of a situation where the paper thickness set by the user does not coincide with the estimated paper thickness, and changes the color correction LUT. Here, the control part 41 (paper thickness estimator 41c) changes the color correction LUT to the color correction LUT corresponding to the estimated paper thickness (S104), and feeds back the information indicating that the color correction LUT has been changed to the controller 20 or the like. Although a series of processing is terminated by switching the color correction LUT in this case, re-execution of the calibration and the like may be executed with the switching of the color correction LUT serving as a trigger. Further, a display such as "paper thickness change confirmed" may be displayed on the display operation unit 47 or the like, whereby the user may instruct the next processing. Examples of the instruction that may be selected by the user include checking again, disregarding and proceeding, and switching the color correction LUT.

As described above, the paper thickness estimation table is determined on the basis of the colorimetric value 1 in which the image portion is measured by the in-line colorimeter 49b, the transmission ratio between the RGB value 1 in which the ground color of the paper sheet is measured and the RGB value 2 in which the offset of the image is measured is calculated by the in-line scanner 49a, and the paper thickness corresponding to the calculated transmission ratio is obtained using the determined paper thickness estimation table, whereby a proper color correction can be executed and an erroneous insertion of a paper sheet can be suppressed. Further, it is not necessary to perform the measurement twice by switching the background plate according to the method in the present example, whereby the paper thickness can be obtained easily and the paper thickness can be estimated while simultaneously performing a different color management function such as the color verification and the calibration.

Note that the present invention is not limited to the examples described above, and the configuration and control of the system and each device may be changed as appropriated without departing from the gist of the present invention.

For example, the printer 40 may be a CMYK printer, an RGB printer, an electrophotographic printer, an inkjet printer, an offset printing machine, and the like, and is not particularly limited.

Although the L*a*b* value of the CIE 1976 color space is exemplified as the colorimetric value in the examples described above, it is not particularly limited thereto, and the XYZ value of the CIE 1931 color space, a color appearance model such as CIECAM02, and the like may be used.

The present invention can be applied to an image processing apparatus that includes a reader such as a scanner and a colorimeter, a paper thickness estimation program that operates in a system including the image processing apparatus, a recording medium that stores the paper thickness estimation program, and a method for estimating a paper thickness for the system.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising: a reader that reads a paper sheet with a background plate serving as a background; and a hardware processor, wherein
   the hardware processor:
   obtains, from the reader, a first color value in which an image on one side of the paper sheet is read, a second color value in which a ground color of the other side of the paper sheet is read, and a third color value in which a portion corresponding to the image on the other side of the paper sheet is read; and
   estimates a thickness of the paper sheet on the basis of the first to third color values while referring to a predetermined table.

2. The image processing apparatus according to claim 1, wherein
   the hardware processor:
   obtains, from each of a plurality of paper sheets having a different thickness in which images having a different density are formed on a front surface thereof, a color value in which a ground color of a back surface of the paper sheet is read and an offset color value in which a portion corresponding to the image on the back surface of the paper sheet is read, and the hardware processor further includes a table generator that generates a table in which a thickness of the paper sheet is associated with a ratio between the color value of the ground color and the offset color value for each density of the image.

3. The image processing apparatus according to claim 2, wherein
   the hardware processor determines a table corresponding to the first color value from the generated table, calculates a ratio between the second color value and the third color value, and obtains a paper thickness corresponding to the calculated ratio using the determined table.

4. The image processing apparatus according to claim 3, wherein
   when there is no table corresponding to the first color value, the hardware processor specifies a first table that corresponds to a density higher than the first color value and a second table that corresponds to a density lower than the first color value, and generates the table corresponding to the first color value by performing an interpolation calculation using the first table and the second table.

5. The image processing apparatus according to claim 1, wherein
   the reader includes a first reader disposed on one side of front and back sides of the paper sheet and a second reader disposed on the other side of the front and back sides of the paper sheet, and measures the first to third color values by one paper feeding.

6. The image processing apparatus according to claim 1, wherein
   the reader includes a first reader and a second reader that are disposed on a same side of front and back sides of the paper sheet, and measures the first to third color values by two paper feedings in which the front and back sides of the paper sheet are reversed.

7. The image processing apparatus according to claim 5, wherein
   a first background plate facing the first reader and a second background plate facing the second reader are in a same color.

8. The image processing apparatus according to claim 7, wherein
the first background plate and the second background plate are white.

9. The image processing apparatus according to claim 1, wherein
the hardware processor estimates the paper thickness on the basis of a solid K image or an image of a plurality of patches.

10. The image processing apparatus according to claim 1, wherein
the hardware processor estimates the paper thickness using an opening/closing of a paper feed tray or an instruction on a front/back adjustment of the paper sheet as a trigger.

11. The image processing apparatus according to claim 1, wherein
the hardware processor notifies a user of the estimated paper thickness or warns the user when a paper thickness set by the user does not coincide with the estimated paper thickness.

12. The image processing apparatus according to claim 1, the image processing apparatus capable of performing a color correction, wherein
when a paper thickness set by a user does not coincide with the estimated paper thickness, the hardware processor switches a color correction table used for the color correction on the basis of the estimated paper thickness.

13. The image processing apparatus according to claim 1, wherein
the first color value is an L*a*b* value or an XYZ value measured by a spectrocolorimeter, and
the second color value and the third color value are an RGB value measured by a scanner.

14. The image processing apparatus according to claim 13, further comprising:
an image former that forms an image on the paper sheet, wherein
the spectrocolorimeter and the scanner are disposed on a paper conveying path that conveys the paper sheet having been subject to image formation.

15. A non-transitory recording medium storing a computer readable program for estimating a paper thickness, the computer readable program to be operated in a system including an image processing apparatus provided with a reader that reads a paper sheet with a background plate serving as a background, the computer readable program causing the image processing apparatus or a control device that controls the image processing apparatus to perform:
obtaining, from the reader, a first color value in which an image on one side of the paper sheet is read, a second color value in which a ground color of the other side of the paper sheet is read, and a third color value in which a portion corresponding to the image on the other side of the paper sheet is read; and
estimating a thickness of the paper sheet on the basis of the first to third color values while referring to a predetermined table.

16. The non-transitory recording medium storing a computer readable program for estimating a paper thickness according to claim 15, the computer readable program causing the image processing apparatus or the control device to further perform:
obtaining, from each of a plurality of paper sheets having a different thickness in which images having a different density are formed on a front surface thereof, a color value in which a ground color of a back surface of the paper sheet is read and an offset color value in which a portion corresponding to the image on the back surface of the paper sheet is read; and generating a table in which a thickness of the paper sheet is associated with a ratio between the color value of the ground color and the offset color value for each density of the image.

17. The non-transitory recording medium storing a computer readable program for estimating a paper thickness according to claim 16, wherein
in the estimating, a table corresponding to the first color value is determined from the generated table, a ratio between the second color value and the third color value is calculated, and a paper thickness corresponding to the calculated ratio is obtained using the determined table.

18. The non-transitory recording medium storing a computer readable program for estimating a paper thickness according to claim 17, wherein
in the estimating, when there is no table corresponding to the first color value, a first table that corresponds to a density higher than the first color value and a second table that corresponds to a density lower than the first color value are specified, and the table corresponding to the first color value is generated by performing an interpolation calculation using the first table and the second table.

19. The non-transitory recording medium storing a computer readable program for estimating a paper thickness according to claim 15, wherein
in the estimating, the paper thickness is estimated on the basis of a solid K image or an image of a plurality of patches.

20. The non-transitory recording medium storing a computer readable program for estimating a paper thickness according to claim 15, wherein
in the estimating, the paper thickness is estimated using an opening/closing of a paper feed tray or an instruction on a front/back adjustment of the paper sheet as a trigger.

21. The non-transitory recording medium storing a computer readable program for estimating a paper thickness according to claim 15, wherein
the first color value is an L*a*b* value or an XYZ value measured by a spectrocolorimeter, and
the second color value and the third color value are an RGB value measured by a scanner.

22. A method for estimating a paper thickness, the method in a system including an image processing apparatus provided with a reader that reads a paper sheet with a background plate serving as a background, comprising:
obtaining, from the reader, a first color value in which an image on one side of the paper sheet is read, a second color value in which a ground color of the other side of the paper sheet is read, and a third color value in which a portion corresponding to the image on the other side of the paper sheet is read; and
estimating a thickness of the paper sheet on the basis of the first to third color values while referring to a predetermined table.

23. The method for estimating a paper thickness according to claim 22, further comprising:
obtaining, from each of a plurality of paper sheets having a different thickness in which images having a different density are formed on a front surface thereof, a color value in which a ground color of a back surface of the paper sheet is read and an offset color value in which a portion corresponding to the image on the back surface of the paper sheet is read; and generating a table in which a thickness of the paper sheet is associated with a ratio between the color value of the ground color and the offset color value for each density of the image.

24. The method for estimating a paper thickness according to claim 23, wherein
in the estimating, a table corresponding to the first color value is determined from the generated table, a ratio between the second color value and the third color value is calculated, and a paper thickness corresponding to the calculated ratio is obtained using the determined table.

25. The method for estimating a paper thickness according to claim 24, wherein
in the estimating, when there is no table corresponding to the first color value, a first table that corresponds to a density higher than the first color value and a second table that corresponds to a density lower than the first color value are specified, and the table corresponding to the first color value is generated by performing an interpolation calculation using the first table and the second table.

26. The method for estimating a paper thickness according to claim 22, wherein
in the estimating, the paper thickness is estimated on the basis of a solid K image or an image of a plurality of patches.

27. The method for estimating a paper thickness according to claim 22, wherein
in the estimating, the paper thickness is estimated using an opening/closing of a paper feed tray or an instruction on a front/back adjustment of the paper sheet as a trigger.

28. The method for estimating a paper thickness according to claim 22, wherein
the first color value is an L*a*b* value or an XYZ value measured by a spectrocolorimeter, and
the second color value and the third color value are an RGB value measured by a scanner.

* * * * *